United States Patent

[11] 3,617,108

| [72] | Inventors | Charles Fritsch<br>Mendham;<br>David J. Prager, East Hanover, both of N.J. |
|---|---|---|
| [21] | Appl. No. | 822,358 |
| [22] | Filed | May 7, 1969 |
| [45] | Patented | Nov. 2, 1971 |
| [73] | Assignee | Bell Telephone Laboratories, Incorporated<br>Murray Hill, N.J. |

[54] A THERMAL LENS HAVING A FLUID-FILLED CYLINDRICAL APERTURE THROUGH THE CENTER OF A SQUARE-SHAPED BLOCK
6 Claims, 4 Drawing Figs.

[52] U.S. Cl. .................................................. 350/96, 350/179
[51] Int. Cl. ....................................................... G02b 3/12, G02b 5/14
[50] Field of Search ........................................... 350/179, 175 GN, 96 WG

[56] References Cited
UNITED STATES PATENTS
3,386,787 6/1968 Kaplan .......................... 350/179 X
3,403,956 10/1968 Miller ........................... 350/179

OTHER REFERENCES
Suematsu et al. " A Light Beam Waveguide Using Hyperbolic-Type Gas Lenses" IEEE Transactions on Microwave Theory and Techniques Vol. MTT- 14, No. 12, Dec. 1966, pp. 647- 665.

*Primary Examiner*—John K. Corbin
*Attorneys*—R. J. Guenther and Arthur J. Torsiglieri ABSTRACT: A gas lens comprising a square block of low-thermal conductivity material having a gas-filled circular cylindrical hole extending longitudinally through its center. A $\cos \theta$ temperature distribution about the periphery of the hole is obtained by establishing a temperature differential between the two pairs of opposite sides of the block. An alternating gradient focusing waveguide is obtained by cascading a plurality of such lenses such that hot and cool surfaces of adjacent units are displaced 90° with respect to each other. It is an advantage of the invention that there is no gas flow through the lens and, hence, through the waveguide. Accordingly, there is no need for flow control apparatus normally associated with gas lenses and gas waveguides.

3,617,108

A THERMAL LENS HAVING A FLUID-FILLED CYLINDRICAL APERTURE THROUGH THE CENTER OF A SQUARE-SHAPED BLOCK

This invention relates to thermal gas lenses and waveguides.

BACKGROUND OF THE INVENTION

In an article by D. W. Berreman entitled "A Lens or Light Guide Using Convectively Distorted Thermal Gradients in Gases," published in the July 1964 issue of the *Bell System Technical Journal*, pages 1469–1475, there is described a thermal gaseous waveguide particularly adapted for the transmission of optical wave energy. It is a characteristic of the waveguide described by Berreman that a thermal gradient is established across the wave path as a means of guiding the optical wave energy propagating therealong.

Recognizing that a gaseous waveguide is intended to transmit wave energy over long distances, it becomes apparent that in order for such a system to be commercially attractive, the waveguide must be both inexpensive to fabricate and economical to operate. That is, the structure should be a relatively simple one, and the operating power requirements should be as small as possible.

SUMMARY OF THE INVENTION

A waveguide in accordance with the present invention comprises a cascade of lenses, each one of which is produced by cutting a circular cylindrical hole through the center of a square block of material and filling the hole with a transparent fluid, such as a gas, or a mixture of gases having significantly different densities. A $\cos 2\theta$ temperature distribution is produced about the periphery of the hole by establishing a temperature differential between the two pairs of opposite outer surfaces of the block. This has the effect of producing a variation in the refractive index of the gas which varies as a function of the square of the distance from the center of the hole. This quadratic variation in the refractive index has two highly desirable characteristics. The first is that within the paraxial approximation, the focal length of every ray passing through a quadratic lens is independent of the radius and, hence, the field reproduces itself after each period. Secondly, as E. A. J. Marcatili has shown in his paper entitled "Modes in a Sequence of Thick Astigmatic Lens-Like Focusers," published in the Nov. 1964 issue of the *Bell System Technical Journal*, the eigenfunctions associated with a quadratic lens are Gaussian. As a result, a laser beam, whose intensity profile is also Gaussian, can be mode matched to a waveguide consisting of quadratic lenses. This means that all the energy tends to remain in the launched mode except for mode conversion induced by lens aberrations.

It is a further advantage of the invention that there is no forced flow of gas. Consequently, a waveguiding system, in accordance with the present invention, has no need for gas storage facilities, pumps, pressure controls, etc. such as are required, for example, in the gas wave guide described in U.S. Pat. No. 3,410,627.

Finally, since each lens comprises no more than a square block with a hole cut through it, it is a substantially less complicated structure than other quadratic lenses, such as, for example, the lens described by Y. Suematsu, K. Iga and S. Ito, ("A Light Beam Waveguide Using Hyperbolic Type Gas Lenses," published in the Dec. 1966 Symposium Issue of the *IEEE Transactions on Microwave Theory and Techniques*") which comprises two pairs of hyperbolic heating elements embedded in a thermal insulation.

These and other objects and advantages, the nature of the present invention, and its various features, will appear more fully upon consideration of the various illustrative embodiments now to be described in detail in connection with the accompanying drawings.

BRIEF DESCRIPTION OF THE DRAWINGS

FIG. 4 shows an alternating gradient focusing waveguide employing thermal gas lenses of the type shown in FIG. 1.

DETAILED DESCRIPTION

Figure 1:
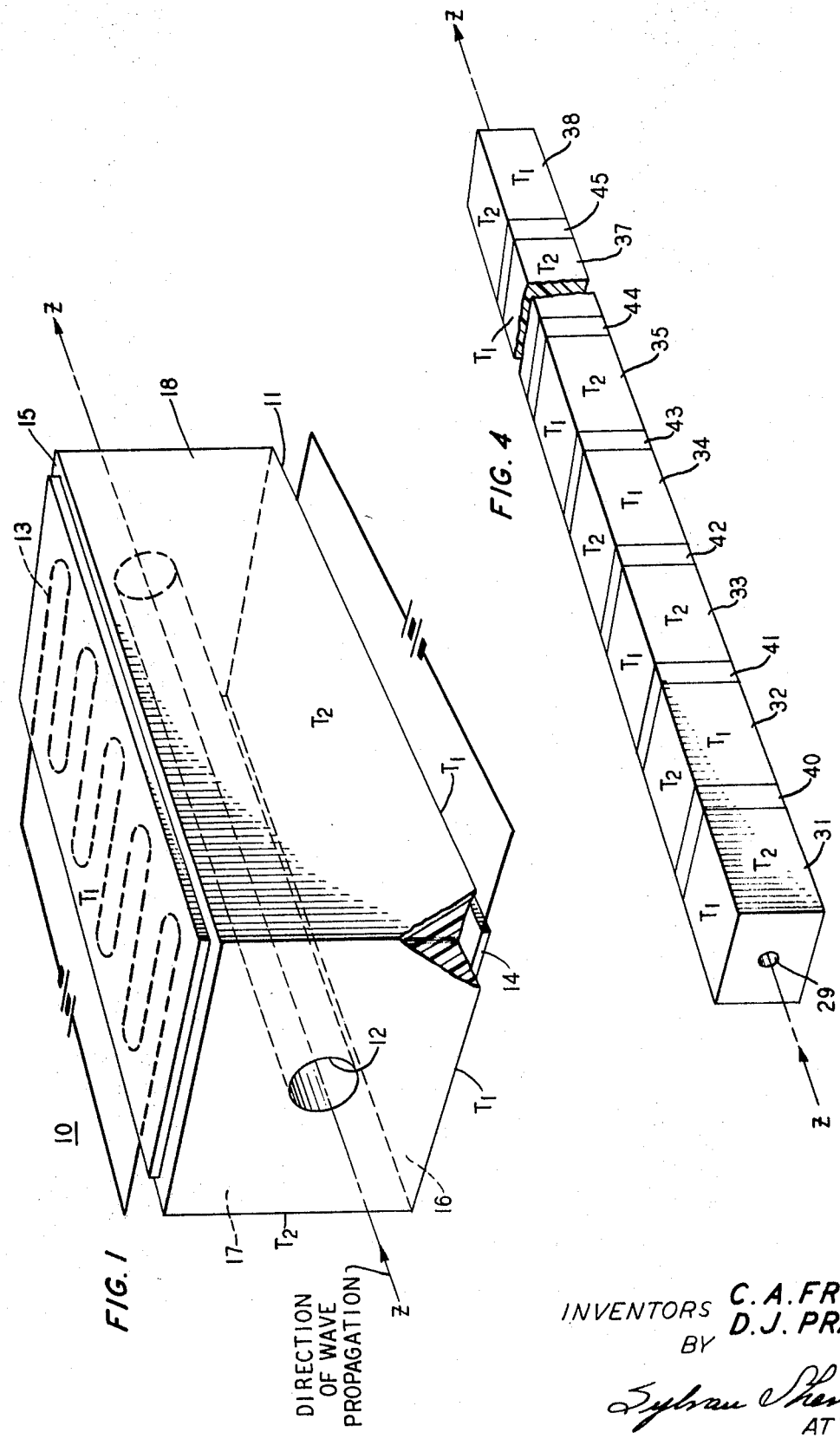
FIG. 1 shows a thermal gas lens in accordance with the present invention.

Referring to the drawings, FIG. 1 shows a thermal gas lens 10, in accordance with the present invention, comprising a block 11 having a circular hole 12 extending longitudinally therethrough. The center of the hole is coaxial with the center of the block and defines the lens axis Z—Z.

The block, which has a square cross section, can be made of any material. However, in order to minimize power consumption, the block is, advantageously, made of a material having a low coefficient of thermal conductivity. For example, foam plastic, having a coefficient of the order of 0.035 watts per meter degree C. would be a suitable material.

The fluid within hole 12 can be either a liquid, a gas or a mixture of gases. Typically, a gas such as air would be used. However, as described in U.S. Pat. No. 3,390,932, the focusing effect can be enhanced by using a particular mixture of a heavy and a light gas.

A thermal gradient is produced in the gas within hole 12 by establishing and maintaining a temperature differential between pairs of opposite outside surfaces of block 11. In the embodiment of FIG. 1, heating means 13 and 14 are located along one pair of opposite sides 15 and 16 of block 10. The other pairs of sides 17 and 18 are maintained at ambient temperature. Heating can be produced, as illustrated in FIG. 1, by the use of resistive heaters in contact with surfaces 15 and 16. Surfaces 17 and 18 are maintained at ambient temperature by placing them in contact with a suitable heat sink, such as air cooling vanes, not shown.

When utilized as part of an underground waveguide, the earth itself provides a relatively uniform heat sink.

Alternatively, one pair of surfaces can be maintained at ambient temperature, and the other pair maintained below ambient, or both pairs of sides can be maintained at temperatures that are different than ambient.

Figure 2:
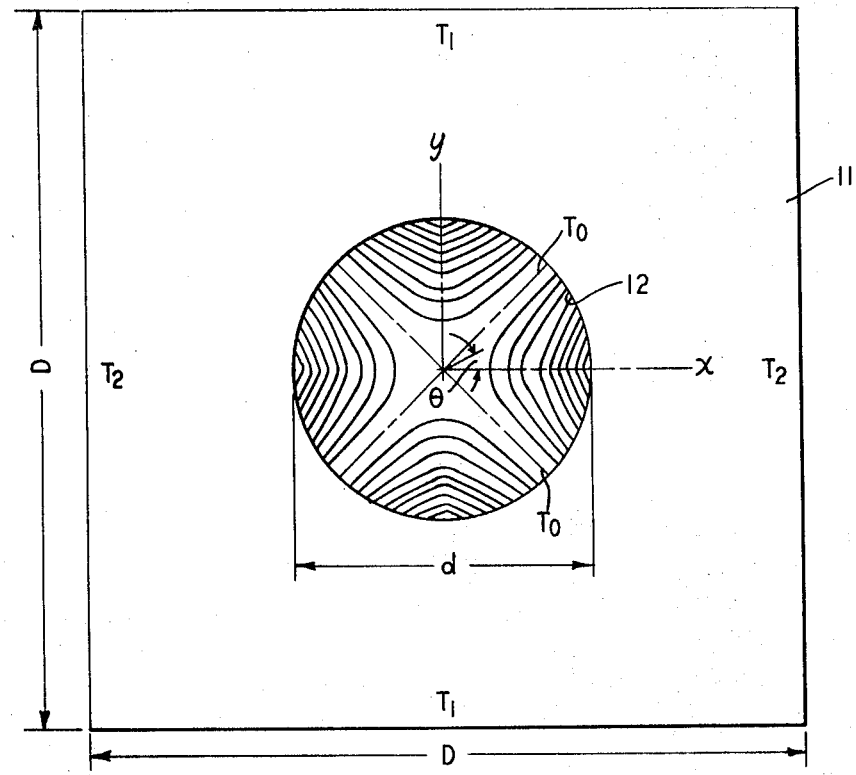
FIG. 2, included for purposes of explanation, shows the temperature contours within the gas lens, neglecting convection effects.

FIG. 2, included for purposes of explanation, shows block 11 and hole 12 disposed in a coordinate system represented by the mutually perpendicular $x$ and $y$ axes. In particular, the axes are oriented parallel to the outer surfaces of block 11 and intersect at the center of hole 12.

It can be shown that when a temperature differential is established between adjacent exterior block surfaces, as in FIG. 1, the temperature distribution about the periphery of hole 12 is given by $$t(\theta) = T_0 + A\cos 2\theta + B\cos 6\theta + C\cos 10\theta + \ldots \quad (1)$$

For ratios of hole diameter $d$ to block dimension $D$ of approximately 0.25 or less, the coefficients $B$ and $C$, of the higher order terms, are less than one part in $10^4$ and, hence, are negligible compared to $A$. Thus simplified, equation (1) reduces to $$t(\theta) = T_0 + A\cos 2\theta \quad (2)$$

where $T_0$ is a constant temperature whose amplitude is equal to $\dfrac{|T_1 + T_2|}{2}$;

$$A = 2.15 \left(\frac{d}{D}\right)^2 \left(\frac{T_1 - T_2}{2}\right) = \Delta T;$$

and $\theta$ is the polar angle measured between one of the coordinate axes and any point about the periphery of hole 12.

Assuming, for purposes of discussion, that $T_2$ is less than $T_1$, and that the angle $\theta$ is measured with respect to the $x$ axis, the wall temperature $t(\theta$ is a minimum $(T_0 - A)$ $\theta = 0$, increases to $T_0 = T_1 + T_2/2$ at $\theta = \pm 45°$ and reaches a maximum $(T_0 + A)$ at $\theta = \pm 90°$. Being symmetric about the $y$ axis, the temperature again decreases to $T_o$ at $\theta = \pm 135°$ and reaches the minimum $(T_o-A)$ at $\theta = 180°$.

Neglecting convection effects, the temperature contours produced in the gas within hole 12 by the above-described wall temperature distribution are hyperbolic. These are illustrated generally in FIG. 2 along with the $T_o$ contours ($\theta = \pm 45°$ and $\theta = \pm 135°$) which are the asymptotes to the hyperbola.

The refractive index of the gas within hole 12 is $$n(r, \theta) = 1 + \frac{(n_o - 1)}{1 + \left(\frac{\Delta T}{T_o}\right)\left(\frac{4r^2}{d^2}\right) \cos 2\theta} \quad (3)$$

which, for small differential temperatures, $\Delta T$, relative to $T_o$, reduces to $$n(r, \theta) = n_o - (n_o - 1)\frac{\Delta T}{T_o}\left(\frac{4r^2}{d^2}\right) \cos 2\theta \quad (4)$$

The change in refractive index, $\Delta n$, at any point $(r, \theta)$ relative to the refractive index $n_o$ at the lens center is then $$n(r, \theta) - n_o = \Delta n = (1 - n_o)\left(\frac{\Delta T}{T_o}\right)\left(\frac{4r^2}{d^2}\right) \cos 2\theta \quad (5)$$

Thus, in general, $$\Delta n = kr^2 \quad (6)$$

and the lens is a quadratic lens.

The focal length of the lens, in terms of its physical dimensions, and externally applied temperatures $T_1$ and $T_2$ is given by $$F = \frac{1}{8} \frac{d^2 T_o}{(n_o - 1)\Delta T L} \quad (7)$$

where
$d$ = the hole diameter;
$T_o$ = the average $T_1 + T_2/2$ of the externally imposed wall temperatures $T_1$ and $T_2$;
$L$ is the length of the lens;
$n_o$ is the refractive index of the gas at the average temperature $T_o$; and $$\Delta T = 2.15 \left(\frac{d}{D}\right)^2 \frac{|T_1 - T_2|}{2}$$

Thus, for a given size block, hole diameter and temperature differential, the lens focal length can be calculated. Conversely, the lens parameters can be determined for any given focal length.

Figure 3:
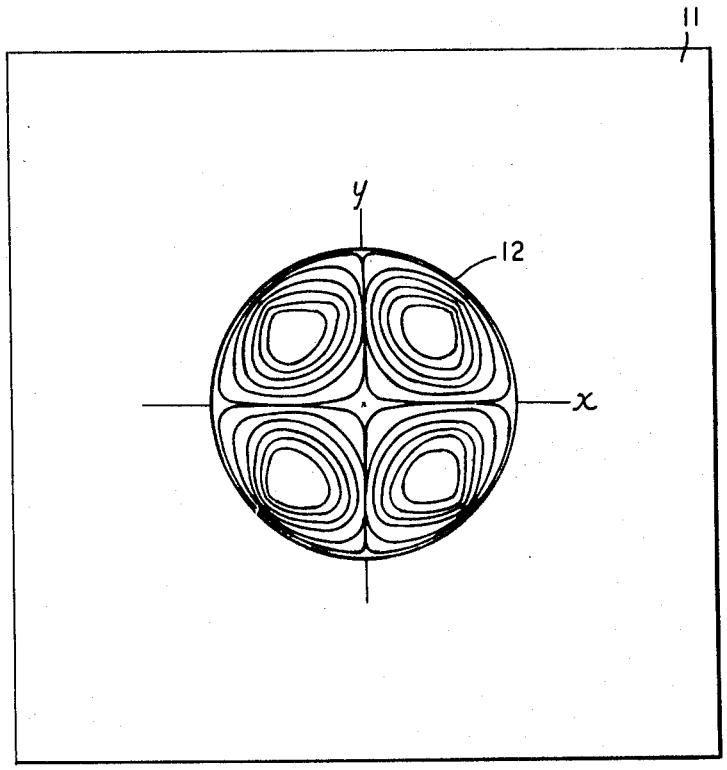
FIG. 3, included for purposes of explanation, shows the temperature contours produced by convection effects within the gas lens.

Thus far, convection effects have been neglected. Obviously, however, heating of the gas within hole 12 will induce a gas flow due to gravitational effects. The convective motion of the gas will, in turn, produce a temperature distortion, such as is shown in FIG. 3, which constitutes a perturbation upon the ideal distribution shown in FIG. 2. Expressing the latter as $T(r,\theta)$ and the perturbation as $RT'(r,\theta)$ the resulting net temperature distribution is given as the sum $$T(r, \theta) + RT'(r,\theta) \quad (8)$$

where $R$ is the Rayleigh number given by $$R = K\Delta T d^3 \quad (9)$$

where $K$ is a constant, characteristic of the gas.

To minimize the perturbation produced by convection flow, the lens parameters are selected such that $RT'(r,\theta)$ is small compared to $T(r,\theta)$. This generally can be done by minimizing $\Delta T$, which is consistent with the previous assumption.

As an example, using air as the focusing medium, a lens 0.6 cm. in diameter and 0.5 meters long will focus a highly collimated beam of initial slope $10^{14}$ m./m., so long as $\Delta T$ 0.59 C. For these values, $R = 2.9$ so that $$|RT'(r, \theta)| < 10^{13} << |T(r, \theta)|_{max.}$$

and the deleterious effects of convection are negligible. The focal length of the lens is 15 m.

In operation, an optical beam is projected into the lens along the lens axis Z—Z. Since, as was explained hereinabove, the refractive index of the gas within the regions of hole 12 defined by $\theta = \pm 45°$ and $\theta = 180° \pm 45°$ decreases as a function of the square of the distance from the lens center, positive, or converging lens action is produced therein. On the other hand, the refractive index of the gas within the regions defined by $\theta = 90 \pm 45°$ and $\theta = 270 \pm 45°$ increases as a function of the square of the distance from the lens center producing, negative, or diverging lens action in these portions of the lens. Thus, the beam is subjected to converging lens action along the $x$ direction, and diverging lens action along the $y$ direction as a result of the gas temperature distribution illustrated in FIG. 2.

To produce a beam waveguide using a plurality of lenses of this type, the alternating gradient focusing technique described by S. E. Miller in his article entitled "Alternating-Gradient Focusing and Related Properties of Conventional Converging Lens Focusing" are employed (see, *Bell System Technical Journal*, July 1964, pp. 1,741–1,758). As explained therein, wave energy can be efficiently guided in a transmission system comprising a series of lenses whose focusing properties are alternately convergent and divergent. Accordingly, a waveguide in accordance with the present invention comprises a sequence of lenses of the type described hereinabove, wherein adjacent lenses are rotated 90°]about the lens axis with respect to the next adjacent lens. In this manner, portions of the beam that experience divergent lens action in one lens, experience convergent lens action in the next lens and, conversely, those portions of the beam that experience convergent lens action in the one lens, experience divergent lens action in said next lens.

FIG. 4 shows an alternating-gradient focusing waveguide comprising a plurality of lenses 31–38 aligned with their centers along a common axis Z—Z. The lenses are, in all respects identical except for the external wall surface temperatures. In particular, the temperature of the outer wall surfaces of adjacent lenses are rotated 90° with respect to each other such that the temperature T1 of the upper and lower wall surfaces of the odd numbered lenses is the temperature of the sidewalls of the even numbered lenses and, conversely, the temperature T2 of the sidewalls of the odd numbered lenses is the temperature of the upper and lower wall surfaces of the even numbered lenses. Spacers 40–45 are preferably included between adjacent lens.

While not shown, it is recognized that an optical beam waveguide, such as described in connection with FIG. 4, would also include beam position sensors for determining the beam position and for redirecting the beam as required. These same techniques can be employed in connection with a waveguide comprising lenses of the type described herein. Thus, it is understood that the above-described arrangements are illustrative of but a small number of the many possible specific embodiments which can represent applications of the principles of the invention. Numerous and varied other arrangements can readily be devised in accordance with these principles by those skilled in the art without departing from the spirit and scope of the invention.

We claim:
1. A lens for electromagnetic wave energy comprising:
a block of material having a square transverse cross section of outside dimension $D$ and longitudinal dimension $L$;
said block having a circular cylindrical hole of diameter $d$ extending longitudinally therethrough, in the direction of wave propagation, with its axis coaxial with the center of said block;
a transparent fluid contained within said hole;
and means for establishing a radial temperature gradient across said fluid comprising:
first means for establishing and maintaining a first temperature T1 along one pair of opposite outside surfaces of said block;
and second means for establishing and maintaining a second temperature T2 along the other pair of outside block surfaces.

2. The lens according to claim 1 wherein the focal length is given by:

$$F = \frac{1}{8} \frac{d^2 T_0}{(n_0 - 1)\Delta T L}$$

where
$$T_0 = \frac{T_1 + T_2}{2}$$
$$\Delta T = 2.15 \left(\frac{d}{D}\right)^2 \frac{|T_1 - T_2|}{2}$$

and $n_o$ = the refractive index of the fluid at temperature $T_o$.

3. The lens according to claim 1 wherein said fluid is a gas.
4. The lens according to claim 1 wherein said material has a low thermal conductivity.
5. The lens according to claim 1 wherein said fluid is a mixture of two gases having different densities.
6. An alternating gradient focusing waveguide for guiding electromagnetic wave energy comprising:
   a plurality of lenses, each in accordance with claim 1, wherein the axes of said lenses are aligned along a common waveguide axis;
   and wherein each lens is rotated 90° about said common axis with respect to the next adjacent lens.

* * * * *

UNITED STATES PATENT OFFICE
CERTIFICATE OF CORRECTION

Patent No. 3,617,108     Dated November 2, 1971

Inventor(s) Charles A. Fritsch and David J. Prager

It is certified that error appears in the above-identified patent and that said Letters Patent are hereby corrected as shown below:

Under "Inventors" after "Charles" add --A.--.
In the Abstract, after "cos" and before "θ" insert --2--.

Col. 1, line 48, change "mode match" to --mode-match--;
      line 64 et seq, after the parenthesis, rest of sentence should not be in italics.

Col. 2, line 17, change "cross section" to --cross-section--;
      line 56, change "Dof" to --D of--;
      line 73, change "t(θ" to --t(θ)--;
      before "θ = 0" insert --at--.

Col. 3, line 16, after "2θ" in equation (4) there should be a period;
      line 21, move "(6)" to the end of the line and align with the other equation numbers;
      line 37, after "L" the rest of the line should not be in italics;
      line 41, at the end of the equation put a period;
      line 45, change "giVen" to --given--;
      line 56, insert a comma at the end of equation (8) and move "(8)" to the end of the line and align with the other equation numbers;
      line 58, insert a comma at the end of equation (9) and move "(9)" to the end of the line and align with the other equation numbers;
      line 66, change "$10^{14}$" to --$10^{-4}$--;
      after "ΔT" add --≥--;
      line 68, change "$10^{13}$" to --$10^{-3}$--.

Col. 4, line 21, change "90°]" to --90°--;
      line 35, change "T1" to --$T_1$--;
      line 36, change "sidewalls" to --side walls--;
      line 38, change "T2" to --$T_2$--.

UNITED STATES PATENT OFFICE
CERTIFICATE OF CORRECTION

Page 2

Patent No. 3,617,108　　　　　　　　　　　Dated November 2, 1971

Inventor(s) Charles A. Fritsch and David J. Prager

It is certified that error appears in the above-identified patent and that said Letters Patent are hereby corrected as shown below:

Claim 1, line 57, change "cross section" to --cross-section--;
　　　　line 67, change "T1" to --$T_1$--;
　　　　line 71, change "T2" to --$T_2$--.

Signed and sealed this 27th day of June 1972.

(SEAL)
Attest:

EDWARD M. FLETCHER, JR.　　　　　ROBERT GOTTSCHALK
Attesting Officer　　　　　　　　　Commissioner of Patents